United States Patent
Wright

(10) Patent No.: US 7,912,040 B2
(45) Date of Patent: Mar. 22, 2011

(54) SYSTEMS AND METHODS FOR DYNAMICALLY ALLOCATING BANDWIDTH OF A SUBSCRIBER LINE THAT CARRIES VOICE OVER INTERNET PROTOCOL (VOIP) TELEPHONE CALLS AND INTERNET PROTOCOL TELEPHONE (IPTV) TRANSMISSIONS

(75) Inventor: Steven Allan Wright, Roswell, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1201 days.

(21) Appl. No.: 11/362,962

(22) Filed: Feb. 27, 2006

(65) Prior Publication Data

US 2007/0201446 A1 Aug. 30, 2007

(51) Int. Cl.
*H04L 12/66* (2006.01)
(52) U.S. Cl. ........ 370/352; 370/230; 370/235; 370/465; 370/230.1; 370/356
(58) Field of Classification Search ............... 370/230, 370/230.1, 235, 465, 352–356
See application file for complete search history.

(56) References Cited

U.S. PATENT DOCUMENTS

| | | | | |
|---|---|---|---|---|
| 6,594,277 B1 * | 7/2003 | Chiang et al. | | 370/465 |
| 6,967,921 B1 * | 11/2005 | Levy et al. | | 370/230.1 |
| 6,990,074 B2 * | 1/2006 | Wan et al. | | 370/235 |
| 7,065,048 B1 * | 6/2006 | Levy et al. | | 370/230.1 |
| 7,623,496 B2 * | 11/2009 | Kitchin | | 370/338 |
| 2003/0142625 A1 * | 7/2003 | Wan et al. | | 370/235 |
| 2004/0114515 A1 * | 6/2004 | Kim | | 370/230 |
| 2007/0140113 A1 * | 6/2007 | Gemelos | | 370/229 |

OTHER PUBLICATIONS

U.S. Appl. No. 11/026,228, filed Jan. 3, 2005, Wright et al.
U.S. Appl. No. 11/026,248, filed Jan. 3, 2005, Wright et al.

* cited by examiner

*Primary Examiner* — Nathan Flynn
*Assistant Examiner* — Khaled Kassim
(74) *Attorney, Agent, or Firm* — Myers Bigel Sibley & Sajovec, P.A.

(57) ABSTRACT

Bandwidth of a subscriber line, such as a Digital Subscriber Line (DSL), that carries Voice over Internet Protocol (VoIP) telephone calls and Internet Protocol Television (IPTV) transmissions is allocated. A message is sent from a VoIP call processor that is associated with the subscriber line and a video server that is associated with the subscriber line, so as to allow a VoIP call to take place at a desired quality of service, notwithstanding concurrent transmission of IPTV to the subscriber line by the video server. The message may be sent by the VoIP call processor in response to initiating setup of a VoIP call for the subscriber line by the VoIP call processor.

17 Claims, 5 Drawing Sheets

SYSTEMS AND METHODS FOR DYNAMICALLY ALLOCATING BANDWIDTH OF A SUBSCRIBER LINE THAT CARRIES VOICE OVER INTERNET PROTOCOL (VOIP) TELEPHONE CALLS AND INTERNET PROTOCOL TELEPHONE (IPTV) TRANSMISSIONS

FIELD OF THE INVENTION

This invention relates to systems, methods, devices and computer program products that use Internet Protocol (IP), and more particularly to systems, methods, devices and computer program products that use Internet Protocol to carry Voice over Internet Protocol (VoIP) telephone calls and Internet Protocol Television (IPTV) transmissions over a subscriber line.

BACKGROUND OF THE INVENTION

Packet data systems, methods, devices and computer program products are increasingly being used to carry voice, video, data and/or multimedia transmissions to a subscriber over a network that uses Internet protocol (IP), such as the Internet. For example, a Digital Subscriber Line (DSL) connection to a customer premises may be used to carry Voice over Internet Protocol (VoIP) telephone calls to one or more VoIP devices and to transmit Internet Protocol Television (IPTV) to one or more television devices. The setup of VoIP telephone calls may be provided via a VoIP call processor, also referred to as a Next Generation Network (NGN) server, a softswitch or a signaling gateway. The setup and transmission of IPTV transmissions may be controlled by a video server, also referred to as a video gateway or an IPTV server. Unfortunately, VoIP telephone calls and IPTV transmissions to multiple devices over a single subscriber line, such as a DSL line, may compete for the finite bandwidth that is available over the subscriber line.

SUMMARY OF THE INVENTION

Some embodiments of the present invention dynamically allocate bandwidth of a subscriber line, such as a Digital Subscriber Line (DSL) that carries Voice over Internet Protocol (VoIP) telephone calls and Internet Protocol Television (IPTV) transmissions, by communicating between a VoIP call processor that is associated with the subscriber line and a video server that is associated with the subscriber line, so as to allow a VoIP telephone call over the subscriber line to take place at a desired quality of service, notwithstanding concurrent transmission of IPTV to the subscriber line by the video server. Accordingly, it may be ensured that VoIP calls, whether voice and/or video, can take place with a desired quality of service, notwithstanding concurrent transmission of IPTV signals to the subscriber line by the video server. In some embodiments, the quality of service of at least one IPTV transmission is reduced and/or at least one IPTV transmission is terminated, so as to allow a VoIP call to take place at a desired quality of service, notwithstanding the concurrent transmission of IPTV over the subscriber line.

In some embodiments, detailed instructions are communicated by the VoIP call processor to the video server, to reduce quality of service of the at least one IPTV transmission and/or to terminate at least one IPTV transmission over the subscriber line. In other embodiments, a maximum bandwidth allocation for IPTV transmission is communicated from the VoIP call processor to the video server. In still other embodiments, a profile of IPTV devices that are associated with a subscriber line and/or a profile of current IPTV transmissions over the subscriber line from the video server, are communicated from the IPTV server to the VoIP call processor, so as to allow the VoIP call processor to determine a reduction in bandwidth that may be needed. The profile may include preferences, which may be defined by the user, to identify priorities for reduction in bandwidth.

In other embodiments of the present invention, a VoIP call processor is operated to allocate bandwidth of a subscriber line that carries VoIP telephone calls and IPTV transmissions, by sending a message from the VoIP call processor that is associated with the subscriber line, to the video server that is associated with the subscriber line, instructing the video server to reduce bandwidth used by IPTV transmissions to the subscriber line in response to initiating setup of a VoIP call for the subscriber line at the VoIP call processor. In some embodiments, the message is sent selectively based upon a determination by the VoIP call processor that the VoIP call may cause available bandwidth on the subscriber line to be exceeded. In other embodiments, the VoIP call processor includes a profile of IPTV receiving devices that are associated with a subscriber line, and the message is sent selectively by VoIP call processor based upon a determination by the VoIP call processor that the VoIP call may cause available bandwidth on the subscriber line to be exceeded in view of the profile. The profile may include preferences, which may be defined by the user, to identify priorities for reduction in bandwidth. In still other embodiments, profile includes current bandwidth usage by the IPTV devices and the VoIP call processor sends the message based on a determination that the VoIP call will cause the available bandwidth on the subscriber line to be exceeded in view of the current bandwidth usage by the IPTV receiving devices. In still other embodiments, the message indicates to the video server an identification of an IPTV transmission that is to be transmitted at reduced quality of service or is to be terminated. In other embodiments, the message only indicates a bandwidth that is available on the subscriber line for IPTV transmissions, and the video server may determine how to reduce quality of service and/or to terminate IPTV transmissions so as to achieve the bandwidth that was indicated in the message.

Other methods of allocating bandwidth may be performed by a video server by reducing bandwidth of IPTV transmissions that are sent by the video server to the subscriber line, in response to receiving a message at the video server from a VoIP call processor that is associated with the subscriber line. The video server may determine a bandwidth to be used for each of a plurality of IPTV transmissions that are currently being transmitted to the subscriber line, for example, based upon a profile that is stored at the video server. The profile may include preferences, which may be defined by the user, to identify priorities for reduction in bandwidth.

Embodiments of the present invention have been described above in connection with methods of communicating between a VoIP call processor and a video server, methods of operating a VoIP call processor and/or methods of operating a video server. However, analogous systems, VoIP call processors and video servers, and analogous computer program products for operating a VoIP call processor and/or a video server, also may be provided according to various embodiments of the present invention.

DETAILED DESCRIPTION

Figure 1:
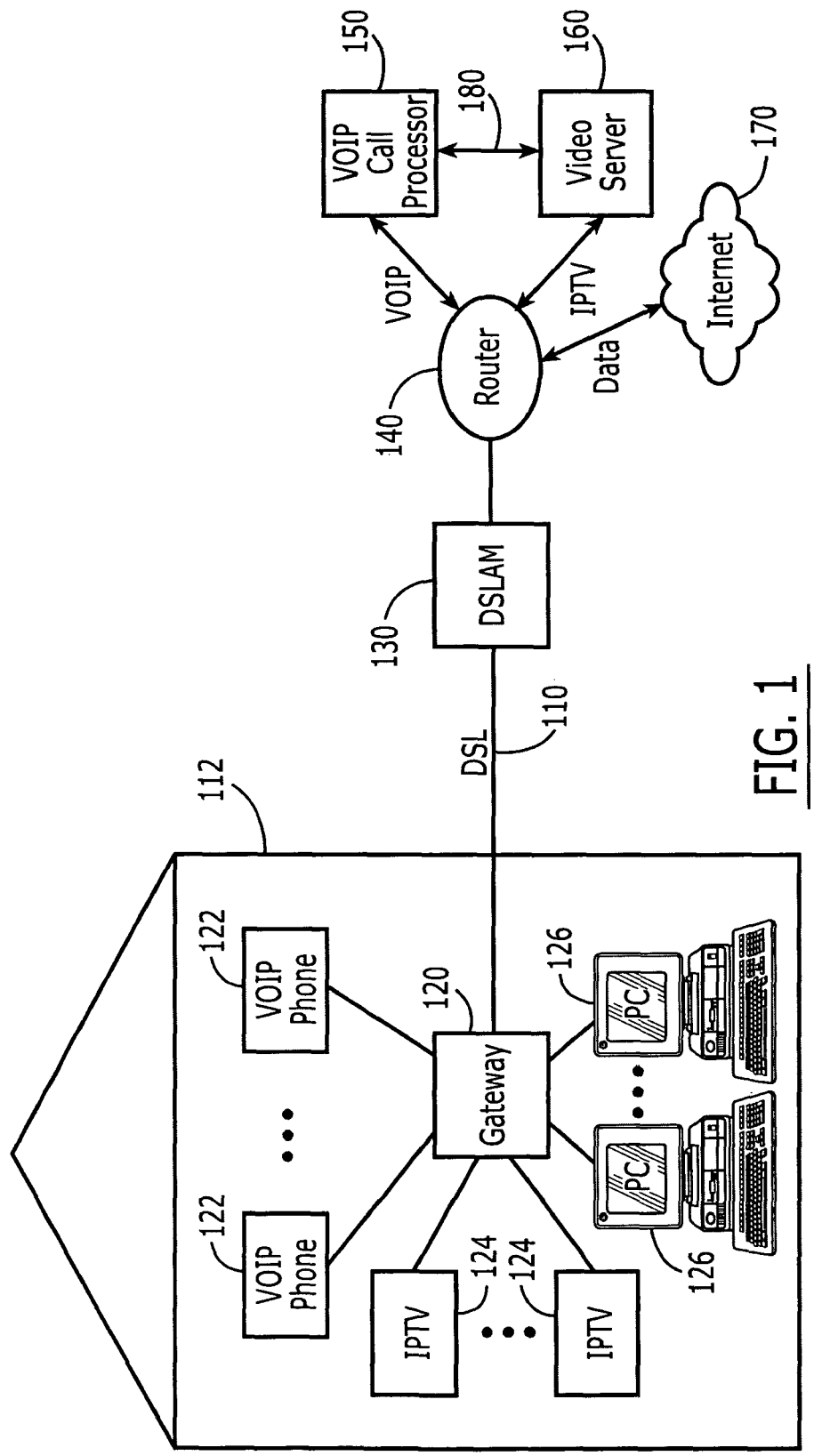
FIG. 1 is block diagram of systems, devices, methods and computer program products for dynamically allocating bandwidth of a subscriber line that carries VoIP and IPTV, according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of systems, devices, methods and/or computer program products for dynamically allocating bandwidth of a subscriber line that carries Voice over Internet Protocol (VoIP) telephone calls and Internet Protocol Television (IPTV) transmissions, according to some embodiments of the present invention. As shown in FIG. 1, a subscriber line 110, such as a Digital Subscriber Line (DSL) is used to provide VoIP, IPTV and/or data access to a plurality of end user devices at a customer premises 112, such as a home, using, for example, a gateway 120, a DSL modem and/or other conventional customer premises distribution device. A DSL Access Multiplexer (DSLAM) 130 is connected to the DSL line 110 at a central office and/or other point in a communications network. As also shown in FIG. 1, the plurality of end user devices are connected to the DSL line 110, and can include one or more VoIP telephones 122, one or more IPTVs 124 and one or more Personal Computers (PCs) 126. As known to those having skill in the art, a VoIP phone 122 may be embodied using an analog telephone adapter, a specialized IP phone and/or a hardware/software package running on a general purpose computer. The VoIP phones 122 may be configured for voice and/or video calls. Moreover, the IPTVs 124 may be embodied as a television including a built-in IP converter, a television connected to a set top box and/or a general purpose computer with IPTV capabilities. Finally, one or more PCs 126 may be configured for data communications over the Internet using, for example, a Web browser. It will also be understood that the functionality of two or more of the devices 122, 124 and/or 126 may be integrated into one or more devices. Moreover, various classes of individual devices may be attached to a given subscriber line 110. For example, the VoIP phones 122 may include voice-only VoIP phone(s) and/or videophone(s). Similarly, the IPTVs 124 may include high definition TVs and low (regular) definition TVs. Finally, various types of data connections also may be provided for the PCs 126.

Continuing with the description of FIG. 1, the DSLAM 130 is connected to a router 140. The router 140 is configured to interface with a VoIP call processor 150, also referred to as a central call processor or a "softswitch", to control the setup and transmission of VoIP telephone calls. The router 140 is also connected to a video server 160, also referred to as a video gateway or an IPTV server, to provide IPTV transmissions. Finally, the router 140 may be connected to an IP network, such as the Internet 170, for data communications. Other connections of the VoIP call processor 150, the video server 160 and/or the Internet 170 can be provided without using a router 140 and/or using other intermediate devices.

The various devices 122, 124, 126 that are connected to the subscriber line 110, may compete for the limited available bandwidth that is available on the subscriber line 110. Session Initiation Protocol (SIP) may be used to control the delivery of various services, as described, for example, in application Ser. No. 11/026,228, filed Jan. 3, 2005, entitled *SIP-Based Session Control*, to the present inventor Wright et al. and/or application Ser. No. 11/026,248, filed Jan. 3, 2005, entitled *SIP-Based Session Control Among a Plurality of Multimedia Devices*, to the present inventor Wright et al., both of which are assigned to the assignee of the present invention, the disclosures of both of which are hereby incorporated herein by reference in their entirety as if set forth fully herein. However, in other embodiments, other protocols may be used.

Continuing with the description of FIG. 1, according to some embodiments of the present invention, bandwidth of the subscriber line 110 that carries VoIP telephone calls and IPTV transmissions is allocated by communicating between the VoIP call processor 150 that is associated with the subscriber line 110, and the video server 160 that is associated with the subscriber line 110, so as to allow a VoIP call over the subscriber line 110 to take place at a desired quality of service, notwithstanding concurrently transmission of IPTV over the subscriber line 110 by the video server 160. The communication between the VoIP call processor 150 and the video server 160 is denoted by the bidirectional arrow 180 of FIG. 1. However, in other embodiments, the communications may only be unidirectional, from the VoIP call processor 150 to the video server 160. The communications 180 may take place over a dedicated line, using the Internet 170 and/or using other communications techniques. In some embodiments, the communications between the VoIP call processor 150 and the video server 180 provide for reducing quality of service of at least one IPTV transmission and/or terminating at least one IPTV transmission to the subscriber line 110, so as to allow a VoIP call to take place at a desired quality of service, such as a real time quality of service that is desired for a voice and/or video telephone call, notwithstanding concurrent transmission of IPTV over the subscriber line 110.

Figure 2:
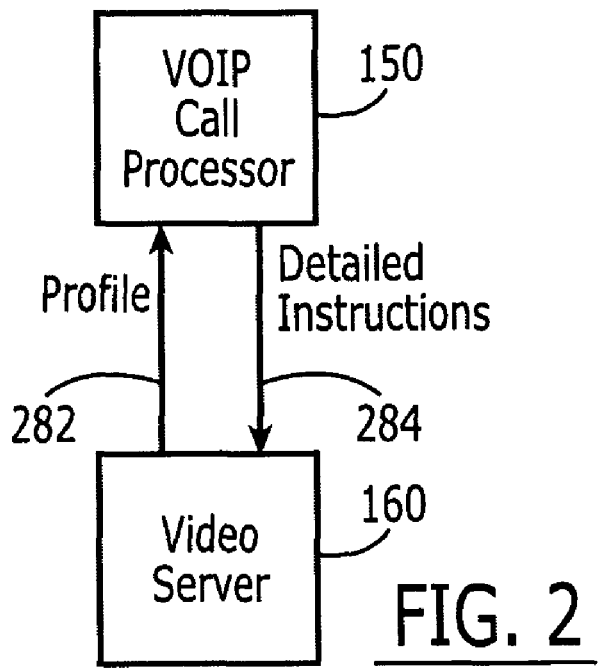
FIGS. 2 and 3 are block diagrams illustrating messages that may passed between a VoIP call processor and a video server, according to some embodiments of the present invention.
Figure 3:
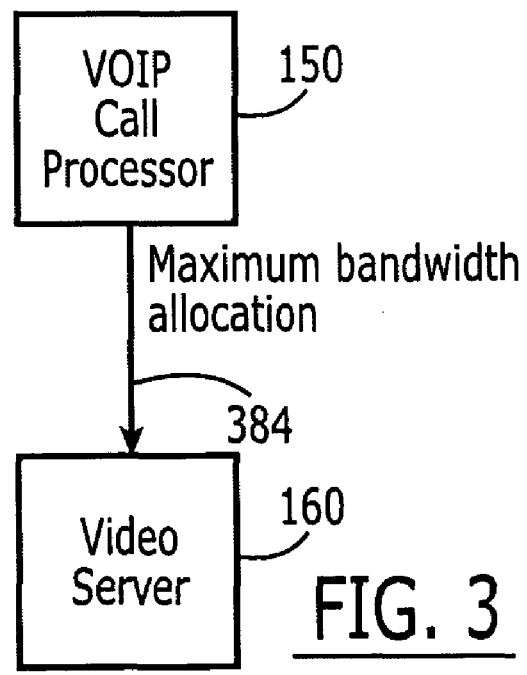

FIGS. 2 and 3 are more detailed block diagrams of communications 180 between a VoIP call processor 150 and a video server 160, according to some embodiments of the present invention. In particular, referring to FIG. 2, in some embodiments, a video server 160 provides to a VoIP call processor 150 a profile 282 of the IPTV devices 124 and/or a profile of current IPTV transmissions over the subscriber line 110. In response to initiating a VoIP phone call, the VoIP call processor 150 provides the video server 160 detailed instructions 284, to reduce quality of service of at least one IPTV transmission and/or to terminate at least one IPTV transmission over the subscriber line. In contrast, in embodiments of FIG. 3, the VoIP call processor 150 provides a maximum bandwidth allocation 384 to the video server 160, and the video server 160 determines how to allocate this maximum bandwidth allocation for IPTV transmissions that are being transmitted over the subscriber line.

Additional description of embodiments of FIGS. 2 and 3 now will be provided. In particular, the profile 282 that is provided to the VoIP call processor 150 can include an identification of the number and capabilities of the IPTV devices 124. For example, an identification of the number of IPTV devices that are connected to a given subscriber line 110 and whether the IPTV devices are High Definition TV (HDTV)-enabled, may be provided. The profile can also include preferences, which may be set by a user, and which can determine a scheme and/or rules for decreasing bandwidth of one or more of the IPTV devices 124 upon setting up of a VoIP call. Detailed discussions of preferences will be provided below. Moreover, the detailed instructions 284 that are provided can include IPTV transmission-specific instructions to cease IPTV transmissions to a given device and/or to reduce IPTV transmissions to a given IPTV device, for example, from high definition to regular definition. Finally, the maximum bandwidth allocation 384 of FIG. 3 may be generated independent of a given knowledge of a profile 282, or may be based on knowledge of a profile 282. Embodiments of FIGS. 2 and 3 also may be combined, to provide, for example, a maximum bandwidth allocation instruction 384, rather than detailed instructions 284, based on a profile 282.

It will also be understood that the profile 282, according to embodiments of the invention, may be based on capabilities of the various IPTV devices 124 or may be based on actual IPTV transmissions that are taking place to the various IPTV devices 124. For example, the profile may be based on the fact that an IPTV device 124 is HDTV-enabled, or may be based on the fact that a regular definition TV signal is currently being transmitted to an IPTV device 124 that is HDTV-enabled.

Figure 4:
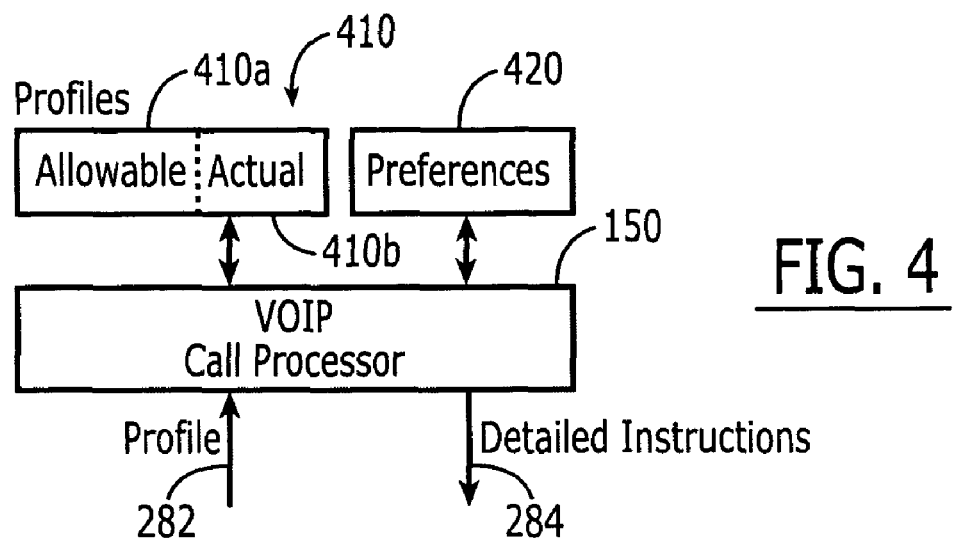
FIG. 4 is a more detailed block diagram of a VoIP call processor, according to some embodiments of the present invention.

FIG. 4 is a block diagram of VoIP call processors 150 according to other embodiments of the present invention. As shown in FIG. 4, the VoIP call processor stores profiles 410 and/or preferences 420 that may be obtained, for example, from the video server 160 via signal 282. One or more types of profiles 410 may be stored. In some embodiments, profiles 140a of allowable IPTV transmissions (i.e., IPTV device capabilities) may be stored. For example, an indication may be stored that a first IPTV device is HDTV-enabled, whereas a second IPTV device is not HDTV-enabled. Alternatively, or in addition, profiles of actual or current transmissions 410b may be stored. For example, an indication may be stored that a given HDTV-enabled IPTV device is currently receiving an HDTV transmission, a regular TV transmission or no TV transmission. Moreover, preferences 420 for allocating a bandwidth also may be stored. These preferences may be governed by a default preference and/or by user selection. For example, one preference rule may indicate that a given IPTV should be throttled back from HDTV to regular definition TV before terminating transmissions to any other IPTV. Another preference rule may indicate that transmission of a given IPTV, for example in a little-used location, should be terminated prior to throttling back HDTV transmission to a primary IPTV location. Other examples of preferences and/or rules also may be provided. Preferences may range from relatively simple to relatively complex and may be updated as new devices are added and/or upon user request.

Figure 5:
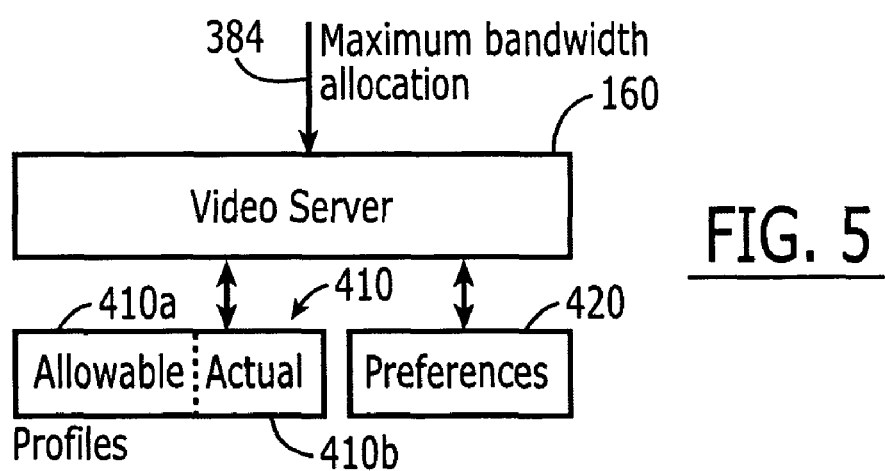
FIG. 5 is a more detailed block diagram of a video server, according to some embodiments of the present invention.

In other embodiments of the invention, as illustrated in FIG. 5, the profiles 410 and/or preferences 420 are associated with the video server 160, and IPTV transmissions may be controlled by the video server 160 in response to a maximum bandwidth allocation signal 384 that is provided by the VoIP call processor 150, using the profiles 410 and/or preferences 420 that are stored at the video server. Thus, in embodiments of FIG. 5, a generalized bandwidth allocation message may be provided by the VoIP call processor 150 to the video server 160, in response to initiation of one or more VoIP phone calls of a given type (audio and/or video), but the actual allocation of bandwidth to one or more IPTVs may be set by the video server 160.

In other embodiments, embodiments of FIGS. 4 and 5 may be combined. For example, stored profiles may be associated with the VoIP call processor 150, whereas preferences may be associated with the video server 160. Other combinations and subcombinations of embodiments of FIGS. 4 and 5 may be provided according to various embodiments of the present invention.

Figure 6:
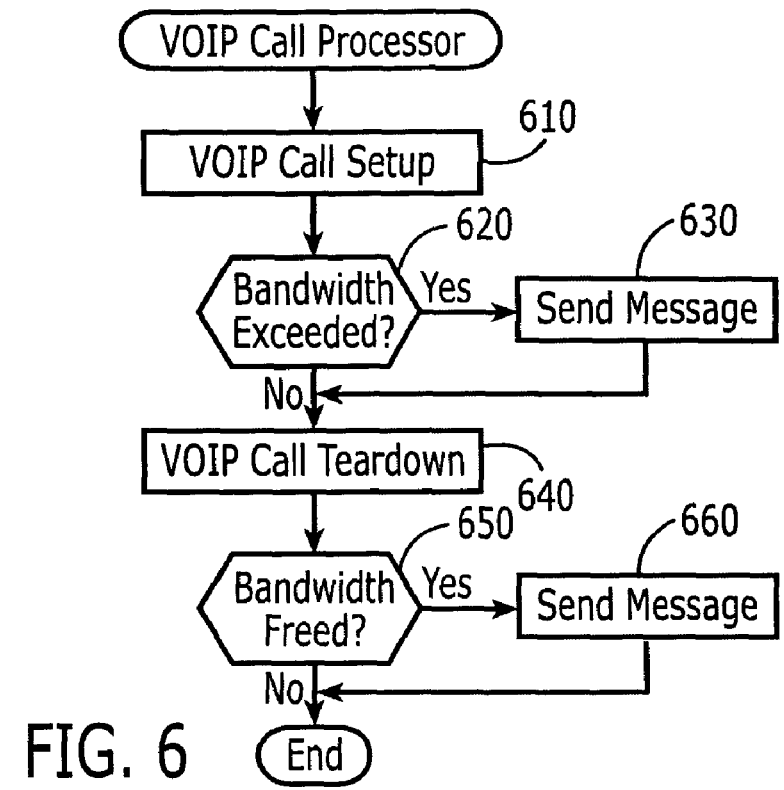
FIG. 6 is a flowchart of operations that may be performed by a VoIP call processor, according to some embodiments of the present invention.

FIG. 6 is a flowchart of operations that may be performed by a VoIP call processor, such as VoIP call processor 150 of FIGS. 1-4, according to various embodiments of the present invention. As shown in FIG. 6, at Block 610, a VoIP call setup is initiated. At Block 620, a determination is made by the VoIP call processor 150 as to whether the bandwidth for the subscriber line 110 will be exceeded upon setting up the VoIP call of Block 610. As was already described in detail, the determination may be made based upon a static profile of IPTV capabilities of the various devices and/or of actual IPTV bandwidth currently being used. In other embodiments, a default determination may be made that some or all IPTV transmission over the subscriber line 110 should be reduced any time a VoIP telephone call is made.

Continuing with the description of FIG. 6, at Block 630, a message is sent from the VoIP call processor 150 to the video server, such as the video server 160 of FIG. 1-3 or 5, instructing the video server 160 to reduce bandwidth used by IPTV transmissions to the subscriber line 110. The message may be sent selectively based upon the determination by the VoIP call processor 150 that the VoIP call may exceed or does, in fact, exceed, available bandwidth on the subscriber line 110. As was described above, the message may include an identification of an IPTV transmission that is to be transmitted at reduced quality of service or is to be terminated and/or may indicate a reduced aggregate bandwidth that is available on the subscriber line for IPTV transmissions.

Continuing with the description of FIG. 6, at Block 640, upon VoIP call teardown, a determination also may be made at Block 650 as to whether bandwidth has now been freed up and, if so, another message may be sent to the video server 160 at Block 660, indicating a specific IPTV transmission that may be reactivated or increased in quality of service and/or a new aggregate bandwidth that is available for all IPTV transmissions.

Figure 7:
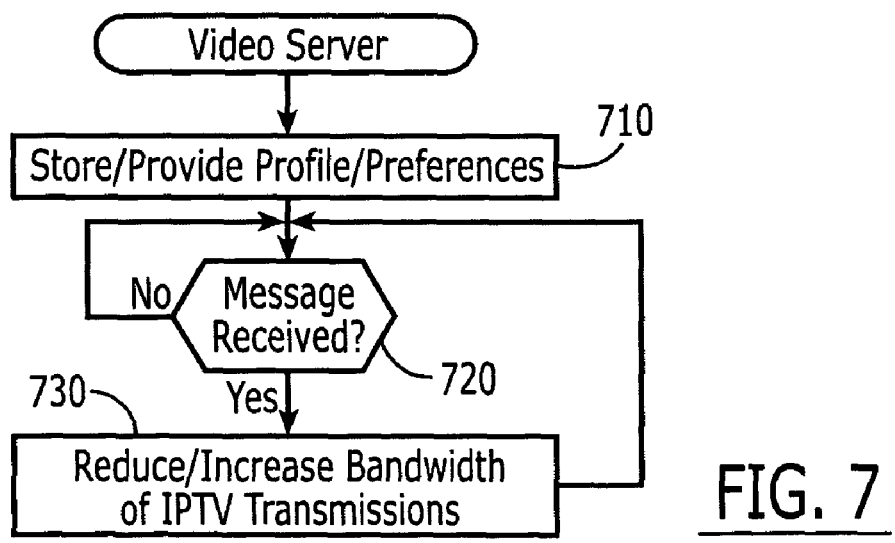
FIG. 7 is a flowchart of operations that may performed by a video server, according to some embodiments of the present invention.

FIG. 7 is a flowchart of operations that may performed by a video server, such as the video server 160 of FIG. 1-3 or 5, according to various embodiments of the invention. As shown at Block 710, in some embodiments, profile(s) and/or preference(s) are stored at the video server 160 and/or provided to the VoIP call processor 150. Then, in response to receipt of a message from the VoIP call processor 150 at Block 720, the bandwidth of IPTV transmissions that are sent by the video server 160 to the subscriber line 110 is reduced and/or increased. As was described above, in some embodiments, the message that is received at Block 720 can identify a bandwidth that is available for each of a plurality of IPTV transmissions that can be transmitted to the subscriber line 110, and the bandwidth of the plurality of IPTV transmissions is reduced at Block 730. In other embodiments, the message that is received at Block 720 identifies a bandwidth that is available for IPTV transmissions that are currently being transmitted to the subscriber line 110, and the bandwidth is reduced and/or increased at Block 730 in response to the message. In still other embodiments, the message of Block 720 identifies a new total bandwidth that is available for IPTV transmissions, and the operations of Block 730 are performed by determining at the video server 160 a bandwidth to be used for each of a plurality of IPTV transmissions that are currently being transmitted to the subscriber line 110 based upon priority scheme(s), which may include preference(s), that are stored at the video server 160.

Figure 8:
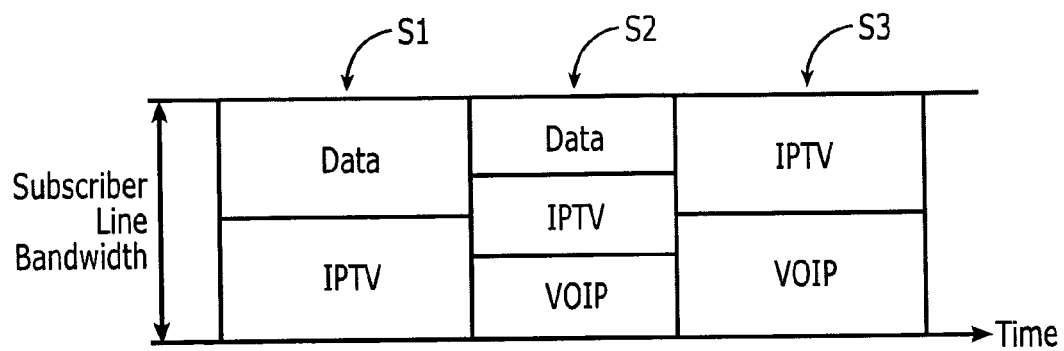
FIG. 8 schematically illustrates dynamic bandwidth allocation, according to some embodiments of the present invention.

FIG. 8 graphically illustrates dynamic allocation of a given subscriber line bandwidth over a series of sessions, according to some embodiments of the present invention. In particular, referring to FIG. 8, in a first session s1, IPTV transmissions take place at a given percentage of the subscriber line bandwidth and data transmission also takes place on a "best efforts" basis using the remaining bandwidth. Then, in a second session s2, in response to setup of a VoIP call, sufficient bandwidth is allocated to the VoIP call to allow the VoIP call to take place with the desired quality of service. The bandwidth available for IPTV and the bandwidth available for data may be reduced correspondingly or in differing proportions, for example by turning off IPTV transmissions to one or more IPTVs and/or by reducing the quality of service to one or more of the IPTVs from high definition to regular definition. Moreover, data transmission may continue to occur on a best efforts basis.

Continuing with the description of FIG. 8, in a third session s3, a second VoIP call may be initiated or a VoIP call may be converted from voice to video, in which case IPTV bandwidth may be further reduced and/or data transmission may be temporarily stopped. It will be understood by those having skill in the art that FIG. 8 merely illustrates example embodiments of the present invention, and shall not be construed as limiting.

Additional examples of communicating between a VoIP call processor 150 and a video server 160 that are associated with a subscriber line 110, so as to allow a VoIP telephone call over the subscriber line to take place at a desired quality of service, notwithstanding concurrent transmission of IPTV to the subscriber line 110 to the video server 160, according to some embodiments of the present invention, now will be provided with reference to FIG. 1. These examples shall be regarded as merely illustrative and shall not be construed as limiting the invention.

In a first example, the VoIP call processor 150 stores a profile of the number and type of IPTVs 124 that are serviced by a given DSL line 110. Assume that four IPTVs 124 are serviced, with one of the IPTVs being high definition. Then, in response to initiation of a VoIP phone call, an instruction 180 may be sent from the VoIP call processor 150 to the video server 160, to throttle back transmission to the one HDTV-capable IPTV device 124, from high definition to regular definition. The video server 160 can then determine whether the high definition transmission is actually taking place and, if so, can throttle back this transmission to regular definition.

In a second example, the profile at the VoIP call processor 150 indicates actual bandwidth being used at a given time. Thus, the profile may indicate that one HDTV-capable IPTV 124 and three regular definition IPTVs 124 are connected to the DSL line 110, but that, currently, only the HDTV IPTV is turned on. Accordingly, no instruction may need to be sent to the video server 160 to throttle back on the IPTV when a VoIP phone call is initiated, since actual usage of the DSL bandwidth relatively low at that time.

In a third example, the VoIP call processor 150 includes a profile and preferences for throttling back. For example, the profile may indicate that one high definition television and three regular definition televisions are being serviced by the DSL line 110. One user preference may indicate that the HDTV transmission should be throttled back from HDTV to regular definition, before transmissions to any other the other IPTVs are terminated. A different user preference may indicate that one or more of the regular definition television transmissions should be terminated before HDTV transmission is throttled back to regular definition. Thus, in response to initiation of a VoIP phone call, the VoIP call processor 150 can send a message to the video server 160 to implement the user preferences, which may be based on the capabilities of the IPTVs that are connected to the DSL line and/or based on the actual transmissions that are being sent over the DSL line 110 at the given time.

The above three examples have all assumed that the profiles and/or preferences are provided to the VoIP call processor 150. However, in other embodiments, as was described above, the profiles and/or preferences may be maintained at the video server 160 and a general instruction to reduce bandwidth by a given amount may be provided by the VoIP call processor 150 to the video server 160 in response to initiation of a VoIP phone call.

Accordingly, some embodiments of the present invention dynamically allocate bandwidth of a subscriber line that carries VoIP telephone calls and IPTV transmissions, and which may also carry data traffic, by communicating between a VoIP call processor and a video server, so as to allow a VoIP call to take place at a desired quality of service, notwithstanding concurrent transmission of IPTV to the subscriber line by the video server. According to some embodiments, quality of service of a VoIP phone call can take precedence over IPTV transmissions, and both VoIP telephone service and IPTV transmissions can take precedence over data transmission. In some embodiments, IPTV transmissions may be throttled back in quality and/or selectively terminated in response to initiation of one or more VoIP telephone calls while data transmissions may continue to proceed at a best efforts basis. In other embodiments, data transmission may also be selectively controlled based on messages that are sent between the VoIP call processor and the data communication network that is being used.

Dynamic allocation may be based upon allocated bandwidth capabilities (for example, measured by the maximum number/type of set top boxes that are connected) and/or by actual bandwidth (for example, measured by the number and type of IPTV streams that are currently being transmitted). Dynamic bandwidth allocation may also take place based on user preferences, which may, for example, turn off an IPTV transmission to a low priority IPTV before reducing quality of service to a high priority IPTV or, alternatively, may throttle back quality of service for all IPTVs before terminating transmission to any given IPTV. In some embodiments, dynamic allocation may be managed by the VoIP call processor, by providing additional information regarding IPTV services to the VoIP call processor. Some embodiments of the invention may be implemented by enhancing the Resource and Admission Control Function (RACF) of the VoIP call processor.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of allocating bandwidth of a subscriber line that carries Voice over Internet Protocol telephone calls and Internet Protocol Television transmissions, comprising:

sending a message from a Voice over Internet Protocol call processor that is associated with the subscriber line to a video server that is associated with the subscriber line instructing the video server to reduce bandwidth used by Internet Protocol Television transmissions to the subscriber line in response to initiating setup of a Voice over Internet Protocol call for the subscriber line at the Voice over Internet Protocol call processor;

reducing bandwidth of Internet Protocol Television transmissions that are sent by the video server to the subscriber line in response to receiving the message at the video server from the Voice over Internet Protocol call processor that is associated with the subscriber line;

wherein reducing bandwidth comprises:

receiving a message from the Voice over Internet Protocol call processor that identifies a total bandwidth that is available for Internet Protocol Television transmissions to the subscriber line;

determining at the video server, a bandwidth to be used for each of a plurality of Internet Protocol Television transmissions that are currently being transmitted to the subscriber line, based upon a priority scheme that is stored at the video server; and transmitting at least one of the plurality of Internet Protocol Television transmissions from the video server to the subscriber line according to the bandwidth that was determined.

2. The method according to claim 1 wherein sending a message is performed selectively by the Voice over Internet Protocol call processor based upon a determination by the Voice over Internet Protocol call processor that the Voice over Internet Protocol call may cause available bandwidth on the subscriber line to be exceeded.

3. The method according to claim 2 wherein the Voice over Internet Protocol call processor includes a profile of Internet Protocol Television receiving devices that are associated with the subscriber line and wherein sending a message is performed selectively by the Voice over Internet Protocol call processor based upon a determination by the Voice over Internet Protocol call processor that the Voice over Internet Protocol call may cause available bandwidth on the subscriber line to be exceeded in view of the profile.

4. The method according to claim 3 wherein the profile includes current bandwidth usage by the Internet Protocol Television receiving devices and wherein sending a message is performed selectively by the Voice over Internet Protocol call processor based upon a determination by the Voice over Internet Protocol call processor that the Voice over Internet Protocol call will exceed available bandwidth on the subscriber line in view of the current bandwidth usage by the Internet Protocol Television receiving devices.

5. The method according to claim 3 wherein the message indicates to the video server an identification of an Internet Protocol Television transmission that is to be transmitted at reduced quality of service including to be terminated.

6. The method according to claim 4 wherein the message indicates to the video server an identification of an Internet Protocol Television transmission that is to be transmitted at reduced quality of service including to be terminated.

7. The method according to claim 1 wherein the message indicates a bandwidth that is available on the subscriber line for Internet Protocol Television transmissions.

8. A method of allocating bandwidth of a subscriber line that carries Voice over Internet Protocol telephone calls and Internet Protocol Television transmissions, comprising:

receiving a message from a Voice over Internet Protocol call processor that is associated with the subscriber line at a video server that is associated with the subscriber line instructing the video server to reduce bandwidth used by Internet Protocol Television transmissions to the subscriber line in response to initiating setup of a Voice over Internet Protocol call for the subscriber line at the Voice over Internet Protocol call processor;

reducing bandwidth of Internet Protocol Television transmissions that are sent by the video server to the subscriber line in response to receiving the message at the video server from the Voice over Internet Protocol call processor that is associated with the subscriber line;

wherein reducing bandwidth comprises:

receiving a message from the Voice over Internet Protocol call processor that identifies a total bandwidth that is available for Internet Protocol Television transmissions to the subscriber line;

determining at the video server, a bandwidth to be used for each of a plurality of Internet Protocol Television transmissions that are currently being transmitted to the subscriber line, based upon a priority scheme that is stored at the video server; and transmitting at least one of the plurality of Internet Protocol Television transmissions from the video server to the subscriber line according to the bandwidth that was determined.

9. The method according to claim 8 wherein reducing bandwidth comprises:

receiving a message from the Voice over Internet Protocol call processor that identifies a bandwidth that is available for each of a plurality of Internet Protocol Television transmissions that can be transmitted by the video server to the subscriber line; and reducing bandwidth of the plurality of Internet Protocol Television transmissions by the video server in response to the message.

10. The method according to claim 8 wherein reducing bandwidth comprises:

receiving a message from the Voice over Internet Protocol call processor that identifies a bandwidth that is available for each of a plurality of Internet Protocol Television transmissions that are currently being transmitted by the video server to the subscriber line; and reducing bandwidth of the plurality of Internet Protocol Television transmissions that are currently being transmitted by the video server to the subscriber line in response to the message.

11. The method according to claim 1 wherein reducing bandwidth comprises:

receiving a message from the Voice over Internet Protocol call processor that identifies a bandwidth that is available for each of a plurality of Internet Protocol Television transmissions that can be transmitted by the video server to the subscriber line; and reducing bandwidth of the plurality of Internet Protocol Television transmissions by the video server in response to the message.

12. The method according to claim 1 wherein reducing bandwidth comprises:

receiving a message from the Voice over Internet Protocol call processor that identifies a bandwidth that is available for each of a plurality of Internet Protocol Television transmissions that are currently being transmitted by the video server to the subscriber line; and reducing bandwidth of the plurality of Internet Protocol Television transmissions that are currently being transmitted by the video server to the subscriber line in response to the message.

13. The method according to claim 8 wherein the message indicates to the video server an identification of an Internet Protocol Television transmission that is to be transmitted at reduced quality of service including to be terminated.

14. The method according to claim 8 wherein the message indicates a bandwidth that is available on the subscriber line for Internet Protocol Television transmissions.

15. A system for allocating bandwidth of a subscriber line that carries Voice over Internet Protocol telephone calls and Internet Protocol Television transmissions, comprising:

a video server that is associated with the subscriber line and that is configured to receive a message from a Voice over Internet Protocol call processor that is associated with the subscriber line instructing the video server to reduce bandwidth used by Internet Protocol Television transmissions to the subscriber line in response to initiating setup of a Voice over Internet Protocol call for the subscriber line at the Voice over Internet Protocol call processor;

the video server being further configured to reduce bandwidth of Internet Protocol Television transmissions that are sent by the video server to the subscriber line in response to receiving the message at the video server from the Voice over Internet Protocol call processor that is associated with the subscriber line;

wherein the video server is configured to reduce bandwidth by performing operations comprising:

receiving a message from the Voice over Internet Protocol call processor that identifies a total bandwidth that is available for Internet Protocol Television transmissions to the subscriber line;

determining at the video server, a bandwidth to be used for each of a plurality of Internet Protocol Television transmissions that are currently being transmitted to the subscriber line, based upon a priority scheme that is stored at the video server; and transmitting at least one of the plurality of Internet Protocol Television transmissions from the video server to the subscriber line according to the bandwidth that was determined.

16. The system according to claim 15 wherein the video server is configured to reduce bandwidth by performing operations comprising:

receiving a message from the Voice over Internet Protocol call processor that identifies a bandwidth that is available for each of a plurality of Internet Protocol Television transmissions that can be transmitted by the video server to the subscriber line; and reducing bandwidth of the plurality of Internet Protocol Television transmissions by the video server in response to the message.

17. The system according to claim 15 wherein the video server is configured to reduce bandwidth by performing operations comprising:

receiving a message from the Voice over Internet Protocol call processor that identifies a bandwidth that is available for each of a plurality of Internet Protocol Television transmissions that are currently being transmitted by the video server to the subscriber line; and reducing bandwidth of the plurality of Internet Protocol Television transmissions that are currently being transmitted by the video server to the subscriber line in response to the message.

* * * * *